March 8, 1966  K. G. HERNQVIST  3,239,745
LOW TEMPERATURE THERMIONIC ENERGY CONVERTER
Filed Aug. 25, 1960  2 Sheets-Sheet 1

INVENTOR.
KARL G. HERNQVIST
BY Thomas R. Webb
AGENT

March 8, 1966 K. G. HERNQVIST 3,239,745
LOW TEMPERATURE THERMIONIC ENERGY CONVERTER
Filed Aug. 25, 1960 2 Sheets-Sheet 2

INVENTOR
KARL G. HERNQVIST
BY Thomas R. Webb
AGENT

United States Patent Office 3,239,745
Patented Mar. 8, 1966

3,239,745
LOW TEMPERATURE THERMIONIC
ENERGY CONVERTER
Karl G. Hernqvist, Princeton, N.J., assignor to Radio
Corporation of America, a corporation of Delaware
Filed Aug. 25, 1960, Ser. No. 51,961
19 Claims. (Cl. 322—2)

This invention relates to thermionic energy converters and more particularly to an improved low temperature thermionic energy converter employing space charge neutralization of the electron stream therein and method of operation thereof.

A thermionic energy converter is a discharge device or tube for directly converting heat into electrical energy. In its simplest form the thermionic energy converter comprises a cathode (electron emitter) and a collector mounted in a vacuum-tight envelope. In operation of such a device, heat is supplied to the cathode to raise the potential energy of some electrons therein from the Fermi level of the cathode to the top of the potential barrier at the cathode surface. For each electron, this increase of energy is equal to $e\phi_k$ in electron volts, where $e$ is the electronic charge, in coulombs, and $\phi_k$ is the thermionic work function of the cathode, or the work in volts required to remove unit charge from the cathode surface. Some of these electrons are emitted from the cathode surface and drift to the collector electrode provided the interelectrode space charge effects are not too great. Electrons which are collected by the collector lose, by virtue of their being collected, an amount of potential energy corresponding to the work function of the collector. This is representative of the difference between the collector surface potential barrier and its Fermi level. This energy appears as heat in the collector. The potential energy remaining in the electrons after collection is represented by the contact difference of potential, that is, the energy corresponding to the work function of the cathode minus the work function of the collector. For high energy-conversion efficiency in such a device it is necessary that the collector work function be substantially lower than the cathode work function. Then, advantage is taken of the fact that the contact difference of potential determines the maximum output voltage. Also, for high efficiency, the adverse effects of space charge in the interelectrode region of the device must be overcome.

An early form of thermionic energy converter was a gas diode including a cathode of relatively high work function, a collector, and an ionizable alkali metal vapor, such as cesium having an ionization potential expressed in volts, lower than the work function of the cathode for producing positive ions in the interelectrode space by contact ionization of the vapor atoms at the surface of the cathode to neutralize the space charge of the electrons emitted by the heated cathode, and hence, increase the current and power output of the tube. Since the ionization potential of cesium is 3.89 volts, this required a high work function cathode such as tungsten (4.5 volts) or molybdenum (4.3 volts), and therefore, the device was necessarily a high temperature device requiring a cathode temperature in excess of 2000° C. for adequate electron emission. Low temperature converters have been proposed in which the cathode comprised an intimate mixture of low work function portions for electron emission and high work function portions for contact ionization of the vapor. When such different work function portions are in contact, that is, have the same Fermi level, the positive ions are produced at a barrier level or potential much higher than electrons, and hence, they are very inefficient in neutralizing the space charge. Therefore, the ionizing elements should be insulated from the electron emitting elements and biased positively with respect to the electron emitting elements by an amount approximately equal to the difference in work functions of the two kinds of elements in order to produce electrons and ions at the same potential level, as described in my paper entitled "Thermionic Converters," published in Nucleonics, vol. 17, No. 7, pp. 49–53, July 1959. The current obtainable in an external load with the optimum bias on the ionizing element in such a converter is considerably greater than that obtainable in the same converter tube with zero bias on this element.

The present invention is predicated upon the realization that a three-electrode converter tube with a positively-biased ion-producing electrode should be capable of delivering even higher output current than that previously obtained, and the discovery that if the gas in the tube is momentarily pre-ionized to form a true plasma, by establishing an initial arc discharge between the cathode and ionizing electrode, or by subjecting the gas to an ionizing radiation, such as gamma rays, while a suitable D.C. bias is applied, a continuous plasma can be maintained indefinitely by the contact-ionization process, after the pre-ionizing is terminated, to produce a constant output current at least 10 times the current obtainable without the pre-ionizing step.

Accordingly, it is an object of this invention to improve the current and power output of a three-electrode thermionic energy converter.

Figure 1:
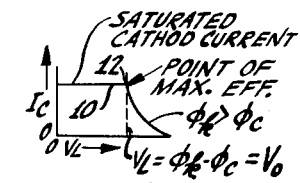
FIG. 1 is a diagram of the theoretical volt-ampere characteristic of a thermionic energy converter diode.

In FIG. 1, which is a graph illustrating a theoretical volt-ampere characteristic curve of a thermionic energy converter diode having given cathode and collector materials in which the cathode work function $\phi_k$ exceeds the collector work function $\phi_c$, the collector current, $I_c$, is plotted as the ordinate and the output voltage, $V_L$, is the abscissa. $V_L$ is equal to $R_L I_c$, where $R_L$ is the load impedance. The curve 10 illustrates the theoretical variation of $I_c$ as the load impedance $R_L$ is varied from zero to a maximum, with constant cathode temperature. The left hand end of the curve represents $R_L = 0$. As $R_L$ is increased from zero, $I_c$ remains constant at a value $I_o$ to the point $R_o$ where $V_L = V_o = R_o I_o = \phi_k - \phi_c$. This indicates that for the values of $R_L$ below $R_o$, $I_c$ is determined by the saturated cathode current $I_o$. In other words, the maximum current obtainable in the device has a limitation dependent upon the particular cathode material and the temperature at which it is operated. As $R_L$ is increased beyond the value $R_o$, $I_c$ decreases exponentially. Thus, it is apparent that the knee 12 of the curve 10 where $V_L = V_o$ is the operation point of maximum efficiency, i.e., where maximum energy or power is obtained from the device. Thus, for maximum efficiency the load resistance $R_L$ must be adjusted to the value $R_o$. Curve 10 illustrates that electrically the thermionic energy converter is a constant current generator up to the point of maximum efficiency, where $V_L = \phi_k - \phi_c$.

Figure 2:
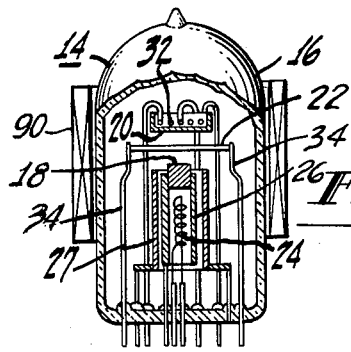
FIG. 2 is a partial axial section view of a simplified embodiment of a three-element low temperature thermionic energy converter tube used in my invention.

FIG. 2 illustrates a three electrode thermionic energy converter tube 14 built and operated, as an experimental embodiment, in accordance with the present invention. The tube 14 comprises an envelope 16 of insulative material in which a cathode element 18, a disk collector electrode 20, and a ribbon ionizing electrode 22 are mounted. A quantity of ionizable gas atoms is included in the envelope. The cathode and collector electrodes 18 and 20 are essentially of the planar type and are disposed in spaced relation with the ribbon ionizing electrode 22 disposed therebetween. The three electrodes 18, 20 and 22 are mounted on conductive supports sealed through the envelope 16. As such, the cathode 18 and ionizing electrode 22 are electrically insulated from each other. The merit of such insulated relationship will be more fully described hereinafter. The ionizing electrode 22 has a work function greater than either the ionization potential of the enclosed gas atoms or the work function of the cathode 18. Preferably, the collector 20 has a work function still lower than that of the cathode 18.

A converter tube according to the structure of the tube 14 built and actually operated according to the invention included a cathode 18 of tungsten impregnated with a barium compound, a tungsten ionizing electrode 22, and collector 20 of nickel coated with barium and strontium oxides. An ionizable gas filling of cesium vapor was included in the envelope.

In some embodiments of my invention, the cathode is adapted to be heated by an external source of heat whose energy it is desired to convert to electrical energy. Such an embodiment is described with reference to FIG. 10. However, my invention will first be described with reference to the converter tube 14 of FIG. 2, in which the cathode 18 is adapted to be heated by radiation from a heater coil 24 disposed adjacent to the cathode 18. The cathode 18 is mounted at one end of a hollow cylindrical housing 26 in which the heater coil 24 is disposed. To prevent excessive heat radiation from the cathode 18, a hollow cylindrical heat shield 27 is disposed around the housing 26. Suitable lead-ins 28 and 30 are sealed through the envelope 16 and connect respectively to the cathode 18 and heater coil 24.

Figure 10:
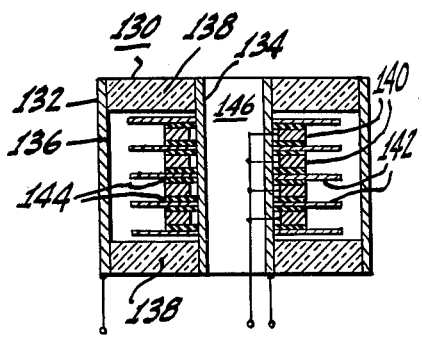
FIG. 10 is an axial section view of another embodiment of a thermionic energy converter according to my invention.

A second heater coil 32 is disposed adjacent the collector 20. A minimum heating of the collector 20 is necessary in order to render its surface of barium and strontium oxides sufficiently conductive so as to serve as an electrode. In the embodiment of FIG. 10, such is not necessary since heat from the heat source is directed outwardly toward the collector rather than radiating in all directions as is so with the heat produced by the heater coil 24. The ionizing electrode 22 is adapted to be electrically heated through its supporting lead-ins 34.

In operation of the converter tube 14, heat from the heater coil 24 serves to raise the temperature of the cathode 18 to a point where it will thermionically emit electrons. The condition which must be realized is that as previously described wherein electrons are provided with an increase of energy sufficient to raise them to the cathode barrier level, whereby some of the electrons will be emitted from the surface of the cathode 18. Simultaneously, atoms of the ionizable gas drift into contact with the heated ionizing electrode 22 and are there ionized by contact (or resonance) ionization. The positive ions so produced serve to neutralize the space charge of the cathode emitted electrons. Electrons so neutralized drift at thermal velocities away from the cathode 18 and into contact with the collector 20. When emitted from the cathode 18, the electrons possess potential energy in excess of that amount which is given up as heat in being collected by the collector 20. The remaining potential energy possessed by the collected electrons is converted to electrical energy and is available as output energy. This output energy is utilized by an external load having one lead connected to the collector 20 and another lead connected to the cathode 18.

Figure 3:
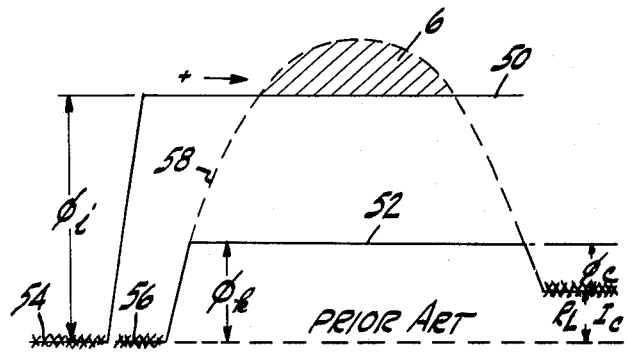
FIG. 3 is a typical potential diagram for a low temperature thermionic energy converter according to the prior art.

FIG. 3 is a potential diagram of a prior art thermionic energy converter having cathode and ionizing electrodes that are not electrically insulated from each other, with a load impedance $R_L = R_o$ so that $V_L = R_L I_c = \phi_k - \phi_c$. In the diagram, an increase of negative potential level is indicated in an upward direction. Thus, the barrier level 50 of the ionizing electrode is at a more negative potential than the barrier level 52 of the cathode when the Fermi levels 54 and 56 of the ionizing electrode and cathode, respectively, are established at the same level by being in contact or otherwise connected together.

FIG. 3 shows that electrons emitted at the barrier level 52 of the cathode, in attempting to drift to the collector, will develop a potential gradient 58 as indicated by the dotted line as the result of space charge. Since the work function $\phi_i$ of the ionizing electrode is much larger than the work function $\phi_k$ of the cathode, and since the Fermi levels of these two electrodes are established at the same level, ions will be produced at the barrier level 50 of the ionizing electrode with a much greater negative potential than the electrons emitted by the cathode. Thus, the ions available for space charge neutralization are capable only of suppressing that portion of the space charge which negatively exceeds the barrier level 50 of the ionizing electrode. This portion is indicated by the shaded area 60. Hence, rather inefficient space charge neutralization is thus obtained in this type of combination-electrode thermionic converter.

However, if the cathode 16 is electrically insulated from the ionizing electrode 22, the Fermi levels of these two electrodes are not necessarily established at the same level, and thus the converter tube 14 may be operated to obtain improved space charge neutralization by contact ionization. This improved condition of neutralization is achieved by an electrical bias between the cathode 18 and the ionizing electrode 22, which is made possible by their mutual electrical insulation.

Figure 4:
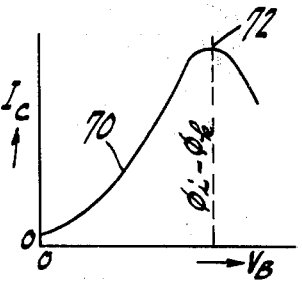
FIG. 4 is a graph illustrating the relationship of bias voltage versus collector current for the tube of FIG. 2.

FIG. 4 is a graph whose curve illustrates the relationship between collector current, $I_c$, plotted as the ordinate and cathode-ionizing electrode bias voltage, $V_B$, plotted as the abscissa. The curve 70 thereof illustrates that with no bias voltage applied between the cathode and ionizing electrodes, a minimum predetermined amount of collector current, $I_c$, will flow. However, as an increasing positive bias is applied to the ionizing electrode 22, $I_c$ increases to a maximum at the point where the bias, $V_B$, equals $\phi_i - \phi_k$, or the difference in the work functions of the ionizing electrode and cathode. Additional increase of $V_B$ results in a decrease of $I_c$. Thus, when a biased condition is established between the cathode 18 and ionizing electrode 22 in the amount of the difference in their work functions, maximum output current, $I_c$, and thus maximum output power is obtained.

Figure 5:
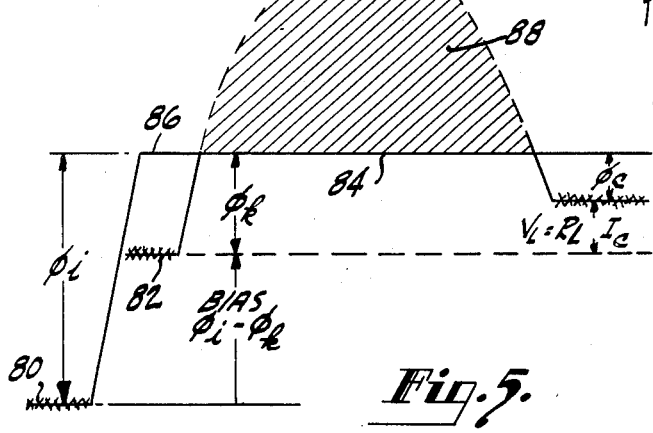
FIG. 5 is the potential diagram for the tube of FIG. 2 operated in accordance with my invention.

FIG. 5 is a potential diagram representing the operation of the converter tube 14 with the ionizing electrode 22 biased positively relative to the cathode 18 in an amount equal to $\phi_i - \phi_k$. As such, optimum operation at the peak 72 of the curve 70 of FIG. 4 is assured. In comparing the potential diagram of FIG. 5 with that of FIG. 3 it will be appreciated that the Fermi level 80 of the ionizing electrode has been shifted in a positive direction (downward on the diagram) relative to the Fermi level 82 of the cathode by an amount equal to the difference in their work functions, $\phi_i - \phi_k$. Thus, the barrier levels 84 and 86 of the ionizing electrode 22 and the cathode 18, respectively, are established at the same potential level, and ions and electrons are thus produced from their respective electrodes at the same potential level. Accordingly, the space charge 88, as indicated by the shaded area, which would exist in the absence of neutralizing ions, can be depressed to the barrier level of the cathode by a sufficient number of positive ions. Since maximum collector current, $I_c$, can flow only when the interelectrode space charge is effectively neutralized, the creation of a bias equal to $\phi_i - \phi_k$ results in maximum collector current as indicated by the point 72 on curve 70 of FIG. 4.

In tests made on a tube as shown in FIG. 2, I found that by applying a bias of $\phi_i - \phi_k$ to the ionizing electrode 22, the output current could be multiplied by a factor of at least 20, as compared with a zero bias. However, I believed that the tube was inherently capable of delivering even higher output current. I analyzed the probable space charge conditions in the vicinity of each of the cathode and ionizing electrode, and reached the conclusion that the contact-ionization process might not be capable of producing sufficient positive ions to initially establish a true plasma in which the space charge of the electrons is completely neutralized, whereas it might be able to sustain a true plasma initially established by some other means. Accordingly, I investigated the effect of pre-ionizing the gas (cesium), independently of the contact-ionization process, by initially establishing a hot cathode arc discharge in the space between the cathode and ionizing electrode. This arc discharge was produced by applying a voltage pulse of more than 5 volts (higher than the ionization potential, 3.89 volts, of the cesium vapor) between the cathode 18 and ionizing electrode 22, with various values of D.C. bias voltage. In these tests I found that once a true plasma had been initially established, by the momentary application of the voltage pulse, the output current from the tube would remain high indefinitely after the termination of the pulse, providing the D.C. bias was within certain limits. Moreover, I found that the continuous current produced by the tube after being so pre-ionized was at least 10 times the maximum current obtainable from the same tube with the same bias but without pre-ionization, and at least 200 times the current obtainable with zero bias. I also found that much improved current stability was obtained by use of a longitudinal magnetic field of the order of 50–100 gauss normal to the cathode emissive surface. This magnetic field may be established by any conventional means, such as a solenoid 90 coaxially surrounding the tube 14.

Figure 6:
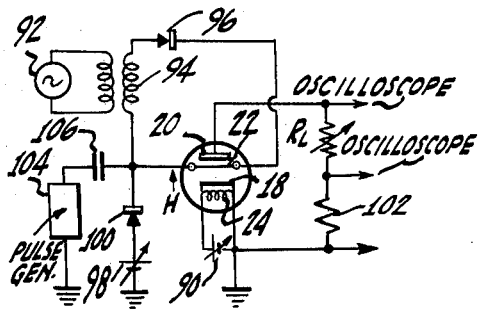
FIG. 6 is a diagram of a test circuit used in connection with my invention.

The circuit used for testing the tube 14 of FIG. 2 is shown in FIG. 6. The cathode 18 was a barium-impregnated tungsten one having a flat surface of about ¼″ diameter. The collector 20 was a nickel disc of about .4″ diameter spaced about .1″ from the cathode. The ionizing electrode 22 was a tungsten ribbon, .040″ wide by .001″ thick. The cathode 18 was heated by a battery 90 connected to the terminals of the heater 24. The ionizing electrode 22 was directly heated by a half-wave rectified 60 cps. current by means of an A.C. source 92, transformer 94 and rectifier 96. Performance measurements were taken during the "off" part of the heating current cycle when there was no voltage gradient along the ionizing electrode 22 (see FIG. 7). An adjustable positive bias voltage (0–5 volts) was applied to the ionizing electrode 22 by a battery 98 in series with a rectifier 100. A variable load $R_L$ was connected in series with the cathode and collector and a very low resistance 102 of known value. The output voltage $V_L$ developed across the load $R_L$ was measured by an oscilloscope. An oscilloscope connected across the resistance 102 measured the output current. In the tests the load $R_L$ was adjusted to make $V_L = \phi_k - \phi_c$, for maximum power output. In order to initiate an arc discharge in the tube, a short (about 1 μ-sec.) positive voltage pulse was applied repeatedly to the ionizing electrode 22 by a pulse generator 104 and a condenser 106 connected in series between the cathode 18 and electrode 22. The pulse generator 104 was synchronized with the 60 cycle heating current of the ionizing electrode 22, with the pulse occurring at the beginning of the "off" part of the cycle. The rectifier 100 avoided shorting of the pulse through the battery 98. A longitudinal magnetic field H was used to confine the discharge to substantially a rectilinear path between the cathode and collector.

Figure 7:
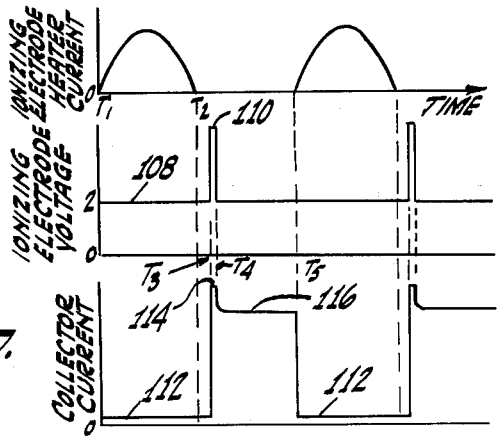
FIG. 7 is a composite graph showing heater voltage, bias voltage and collector current as a function of time in the circuit of FIG. 6.

FIG. 7 shows the variation of the heater current, the voltage of the ionizing electrode with respect to the cathode and the collector current with time over about two cycles of the heater current. As shown, the positive D.C. bias 108 on the ionizing electrode 22 was maintained at 2 volts and the voltage pulse 110 was applied during the time $T_3$–$T_4$, just after the beginning $T_2$ of the "off" part of each cycle. During the time between $T_1$ and $T_3$ the collector current was constant at a relatively low value 112. When the pulse 110 was applied, the net voltage on the ionizing electrode 22 was increased beyond the ionization potential of the cesium vapor, and hence, the vapor was ionized to form a plasma, resulting in an abrupt increase in collector current to the value 114. On termination of the pulse 110, instead of dropping to its initial low value 112, the collector current became stabilized at a constant value 116, somewhat lower than the pulse current 114 but still extremely high compared to the value 112 before application of the pulse. At the time $T_5$, the heater voltage was again applied and a voltage gradient occurred along the ionizing electrode. Consequently, the proper bias conditions were no longer satisfied for some part of the ionizing electrode, and the collector current dropped to the low value 112 again.

Figure 8:
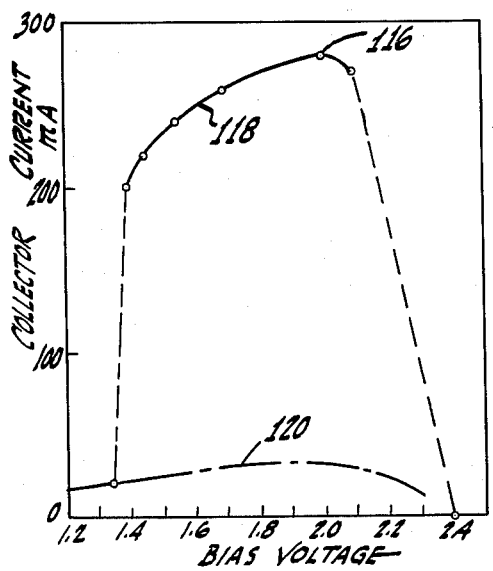
FIG. 8 is a graph of collector current plotted against bias voltage.

The upper curve 118 in FIG. 8 shows the variation of the stable collector current (after termination of the pulse) in FIG. 7 with D.C. bias voltage. For values of bias voltage equal to or less than about 1.35 volts, the stable collector current was the same as if no pulse had been applied. At 1.4 volts bias, the stable current following the pulse was about 10 times the current at 1.35 volts bias. The current increased with increasing bias up to a peak or maximum 116 at about 2 volts, which corresponds to the current 116 in FIG. 7, and then decreased, dropping to practically zero at about 2.4 volts bias. It appears that too low a bias voltage results in a retarding field at electrode 22 and an insufficient supply of ions, and that if the bias voltage is too high the ions are accelerated before entering the plasma, which diminishes their ability to neutralize the electronic space charge. The 2 volt bias in FIG. 8 represents the optimum bias, $\phi_i - \phi_k$, for the particular materials used in these tests. The shape of the curve between 2.1 and 2.4 volts bias was not determined experimentally, and hence, is shown dotted. FIG. 8 shows the existence of a relatively wide useful operating range of bias voltage, extending above and below the optimum value, in which high current operation is obtained by pre-ionizing the tube as described herein. The dash-dot lower curve 120 in FIG. 8 shows the collector current produced with no pre-ionization, for comparison with the stable current following the application of the pulse. The peak current 116 in FIG. 8 was nearly 300 ma., which, with the particular cathode used in these tests, represented a current density of the order of 1 ampere/cm.$^2$. The efficiencies of conversion of heat energy supplied to the cathode and ionizing electrode to electrical energy output in various tests were 10–15%. These efficiencies compare favorably with efficiencies obtained in high temperature converter diodes.

I also made tests on the tube 14 of FIG. 2 in the circuit of FIG. 6 to determine the effect of varying the temperature of the ionizing electrode while maintaining a fixed bias voltage, within the useful operating range, and constant cathode temperature. At temperatures of about 1350° and below, for the particular tube tested, the stable collector current (after termination of the pulse) was extremely low, as in the case of low bias voltage. The stable current was about 240 ma. at about 1360° C. and increased to saturation at about 270 ma. at about 1420° C. Thus, at a certain minimum temperature the ionizing electrode produces sufficient ions to maintain a high stable current.

Figure 9:
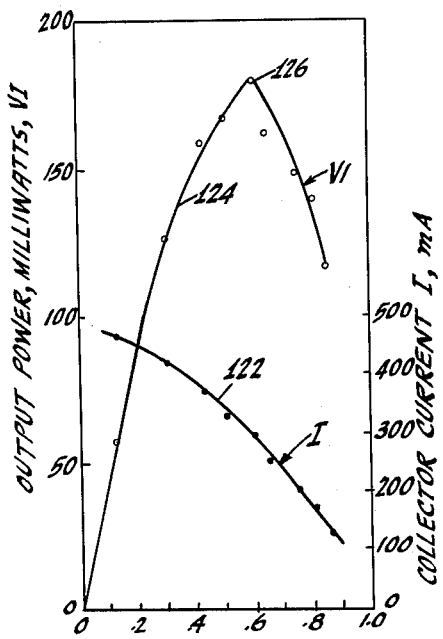
FIG. 9 is a graph of collector current and power output plotted against collector voltage.

FIG. 9 shows curves for the collector current 122 and output power 124 as a function of the collector or load voltage, $V_L$, for the tube 14, obtained by varying the load impedance $R_L$, with a bias of 2 volts and a cathode temperature of 1100° C. Curve 122 shows that the collector current does not remain constant for any appreciable range, in contrast with the theoretical curve shown in FIG. 1. The output power reached a peak or maximum at about 0.6 volt, as shown by the point 126 on curve 124. In fact, this is a convenient and accurate method of determining $\phi_k - \phi_c$ for particular cathode and collector materials of unknown or uncertain work functions.

Instead of using a voltage pulse to initiate an arc discharge as described above, the gas in the tube can be momentarily pre-ionized to initially establish a true plasma in other ways, such as by subjecting it to an ionizing radiation of gamma rays or X-rays.

The high output current is produced in accordance with the present invention merely by maintaining the cathode and ionizing electrode at electron-emitting and contact-ionizing temperatures, respectively, and the ionizing electrode at the optimum bias potential, and momentarily ionizing the gas, without any external voltage source connected between the cathode and collector. Hence, the invention is quite different from thyratron, plasmatron and other gas tubes which require such external voltage sources to supply appreciable output current or voltage.

Examples of suitable collector compositions that can be used, chosen only because of their relatively low work function, include the following: a mixture of barium and strontium oxides on a nickel base resulting in a work function of approximately 1.0 electron volt; cesiated silver oxide having a work function of approximately 0.75 volt; and cesiated tungsten oxide having a work function of approximately 0.71 volt. Examples of suitable cathode compositions, which are believed to provide an optimum compromise between the considerations of a high value of $\phi_k - \phi_c$ and low temperature electron emission, include the following: sintered tungsten particles impregnated with known suitable barium compounds, having a minimum work function of approximately 1.7 volts and a thermionic emission temperature of approximately 900–1200° C.; thoriated tungsten, having a minimum work function of approximately 2.55 volts and a thermionic emission temperature of approximately 1550–2000° C.; and cesiated tungsten, having a minimum work function of approximately 1.7 volts and a thermionic emission temperature of approximately 1400–1600° C. Any cathode-collector combination of the above-listed materials may be used, as well as combinations of other materials.

Preferred ionizing electrode materials include iron, tungsten, molybdenum, tantalum, platinum, nickel and rhenium; all of which have work functions high enough to provide contact ionization of the preferred cesium vapor.

Suitable ionizable gases include the vapors of francium, cesium, rubidium, potassium, and sodium. However, it should be noted that not all of these gases will be contact ionized by all of the listed ionizing electrode materials.

Instead of producing positive ions by contact ionization to maintain a stable high current after application of the pre-ionizing pulse or radiation, the ionizing electrode 22 and cesium gas can be replaced by an electrode which when heated to suitable temperature emits positive ions directly. An example of such an ion emitter electrode is a material known as β-eucryptite, $Li_2OAl_2O_32SiO_2$, having the composition:

| | Percent |
|---|---|
| $Li_2O$ | 11.8 |
| $Al_2O_3$ | 40.5 |
| $2SiO_2$ | 47.7 |

This material emits positive lithium ions when heated to temperatures above about 100° K. (1273° C.). When such an ion emitter is used, the tube envelope should be filled with an inert gas, such as xenon, at a relatively low pressure, of the order of .01 mm. of mercury, for ionization by a voltage pulse or ionizing radiation to establish an initial plasma, in accordance with the present invention. A disadvantage of using an ion emitter to supply the positive ions for maintaining the stable current is the limited life of the ion emitting material. In the claims, the terms "electrode" and "ion producing electrode" are intended to be generic to either a contact-ionizing electrode or an ion emitting electrode.

FIG. 10 illustrates a preferred embodiment of my invention. A thermionic energy converter tube 130 comprises an annular vacuum-tight envelope 132 comprising an inner cylindrical metal wall 134 and an outer cylindrical metal wall 136 closed at their ends by annular insulator walls 138. A quantity of ionizable gas atoms, such as cesium vapor, are included within the envelope 132. Mounted within the envelope and concentrically surrounding the inner wall 134 is a stacked array of cathode elements 140 and ionizing elements 142. The composition of the ionizing and cathode elements and the gas atoms are such that the work function of the ionizing elements exceeds the work function of the cathode elements and the ionization potential of the gas atoms. The cathode and ionizing elements 140 and 142 are electrically insulated from each other by electrical insulator washers 144. Since the ionizing elements 142 require a higher temperature than the cathode elements, the former are preferably in contact with the inner wall 134, as shown, and the electrical insulator washers 144 are of a material such as beryllium oxide which permits good thermal conductivity from the ionizing elements 142 to the cathode elements 140. The outer wall 136 of the thermionic converter 130 serves as the collector electrode of the tube.

The hollow opening 146 in the coverter tube 130 is such as to accommodate an external source of heat for heating the metallic inner wall 134 of the envelope and the elements 140 and 142 in the operation of the converter. It will be appreciated that such operation is not limited to use of any particular kind of heat source but may function in response to any heat source capable of raising the elements 140 and 142 to suitable temperatures. Suitable heat sources include ordinary flames, nuclear reactors, solar energy, and radio-active energy.

One characteristic of the thermionic energy converter wherein the difference between the work functions of the cathode and collector electrodes determines the output voltage, is that a relatively low voltage device results. If a higher voltage output is desired a plurality of converters may be electrically coupled in series so as to produce an additive, higher output voltage.

What is claimed is:

1. The method of operating a thermionic energy converter comprising an envelope containing an ionizable gas, a collector and electrode means including a low temperature thermionic cathode for producing electrons and positive ions; said method comprising the steps of momentarily ionizing said gas to produce an initial plasma in said envelope, while energizing said electrode means without applying any voltage between said cathode and said collector to maintain a continuous plasma in said envelope after the production of said initial plasma.

2. A thermionic energy converter comprising an envelope containing an ionizable gas, a collector and electrode means including a low temperature thermionic cathode for producing electrons and positive ions, means for momentarily ionizing said gas to produce an initial plasma in said envelope, and means devoid of any voltage source connected between said cathode and said collector for energizing said electrode means to maintain a continuous plasma in said envelope after the production of said initial plasma.

3. The method of operating a thermionic energy converter comprising an envelope containing a thermionic cathode, a collector spaced from said cathode, an ionizable gas and an electrode located adjacent to and electrically insulated from said cathode and adapted when heated to produce positive ions independently of ionization by electron impact; said method comprising the steps of maintaining said cathode at electron emitting temperature, maintaining said electrode at a positive D.C. potential with respect to said cathode below the ionization potential of said gas, and momentarily ionizing said gas to produce an initial plasma in said envelope while maintaining said electrode at ion-producing temperature to maintain a continuous plasma in said envelope after the production of said initial plasma.

4. The method of operating a thermionic energy converter comprising an envelope containing a thermionic cathode, a collector spaced from said cathode, an ionizable gas and an electrode located adjacent to and electrically insulated from said cathode and adapted when heated to produce positive ions independently of ionization by electron impact; said method comprising the steps of maintaining said cathode at electron emitting temperature, maintaining said electrode at a positive D.C. potential with respect to said cathode below the ionization potential of said gas, and pulsing said electrode to a potential higher than said ionization potential to momentarily ionize said gas by electron impact and produce an initial plasma in the space between said cathode and said electrode while maintaining said electrode at ion-producing temperature to maintain a continuous plasma in said space after the production of said initial plasma.

5. The method of operating a low temperature thermionic energy converter comprising an envelope containing a thermionic cathode having a given work function, a collector spaced from said cathode, an ionizable gas having an ionization potential higher than said cathode work function, and an electrode located adjacent to and electrically insulated from said cathode and having a work function higher than said ionization potential; said method comprising the steps of maintaining said cathode at electron emitting temperature, maintaining said electrode at a positive D.C. potential with respect to said cathode below said ionization potential, and pulsing said electrode to a potential higher than said ionization potential to momentarily ionize said gas by electron impact and produce an initial plasma in the space between said cathode and said electrode while maintaining said electrode at a temperature to produce positive ions by contact ionization of said gas and maintain a continuous plasma in said space after the production of said initial plasma.

6. A thermionic energy converter comprising an envelope containing a thermionic cathode, a collector spaced from said cathode, an ionizable gas, and an electrode located adjacent to and electrically insulated from said cathode and adapted when heated to produce positive ions independently of ionization by electron impact, means for maintaining said cathode at electron-emitting temperature, means for momentarily ionizing said gas to produce an initial plasma in said envelope, means for biasing said electrode at a positive D.C. potential with respect to said cathode below the ionization potential of said gas, and means for maintaining said electrode at ion-producing temperature to produce sufficient positive ions in said envelope to neutralize the space charge of the electrons emitted by said cathode and maintain a continuous plasma after the production of said initial plasma.

7. A low temperature thermionic energy converter comprising an envelope containing a thermionic cathode having a given work function, a collector spaced from said cathode, an ionizable gas having a given ionization potential, and an ion producing electrode located adjacent to and electrically insulated from said cathode and having a work function substantially higher than said cathode work function, said electrode being adapted when heated to produce positive ions independently of ionization by electron impact, means for maintaining said cathode at electron-emitting temperature, means for momentarily ionizing sad gas to produce an initial plasma in the space between said cathode and said electrode, means for biasing said electrode at a positive D.C. potential with respect to said cathode below the ionization potential of said gas, and means for maintaining said electrode at ion-producing temperature to produce sufficient positive ions in said space to neutralize the space charge of the electrons emitted by said cathode and maintain a continuous plasma after the production of said initial plasma.

8. A converter as in claim 7, wherein said positive potential is substantially equal to the difference between the work functions of said cathode and said electrode.

9. A converter as in claim 7, wherein said collector has a work function substantially lower than said cathode work function.

10. A converter as in claim 7, wherein the ionization potential of said gas is lower than the work function of said electrode, for contact ionization of said gas by said electrode to produce said positive ions.

11. A converter as in claim 7, further comprising means for establishing a confining magnetic field extending between said cathode and said collector.

12. A converter as in claim 7, wherein said means for heating the cathode and said electrode comprise a portion of said envelope in heat ransfer relation with said cathode and said electrode.

13. A converter as in claim 7, wherein said cathode and said electrode comprise a plurality of elements disposed alternately in a stacked array, with a plurality of electrical insulator elements each interposed between adjacent cathode and electrode elements.

14. A converter as in claim 13, wherein said insulator elements are made of a material having good thermal conductivity.

15. A converter as in claim 14, wherein said means for heating said cathode and said electrode comprise a metallic portion of said envelope in contact with said electrode elements.

16. A converter as in claim 7, wherein said ionizing means comprises means connected to said cathode and said electrode for applying a voltage pulse thereto greater than the ionization potential of said gas, for producing an initial arc discharge in said space.

17. A converter as in claim 7, further comprising an output impedance including no voltage source connected directly between said cathode and said collector.

18. The method of operating a thermionic energy converter comprising an envelope containing a thermionic cathode, a collector spaced from said cathode, an ionizable gas and an electrode located adjacent to and electrically insulated from said cathode and adapted when heated to produce positive ions independently of ionization by electron impact; said method comprising the steps of maintaining said cathode at electron emitting temperature, and momentarily ionizing said gas to produce an initial plasma in said envelope while maintaining said electrode at ion-producing temperature to maintain a continuous plasma in said envelope after the production of said initial plasma.

19. A thermionic energy converter comprising an envelope containing a thermionic cathode, a collector spaced from said cathode, an ionizable gas, and an electrode located adjacent to and electrically insulated from said cathode and adapted when heated to produce positive ions independently of ionization by electron impact, means for maintaining said cathode at electron-emitting temperature, means for momentarily ionizing said gas to produce an initial plasma in said envelope, and means for maintaining said electrode at ion-producing temperature to produce sufficient positive ions in said envelope to neutralize the space charge of the electrons emitted by said cathode and maintain a continuous plasma after the production of said initial plasma.

References Cited by the Examiner

UNITED STATES PATENTS

| | | | |
|---|---|---|---|
| 2,453,118 | 11/1948 | Buckingham | 313—221 |
| 2,803,774 | 8/1957 | Sabine | 313—161 |
| 2,980,819 | 4/1961 | Feaster | 313—212 |

GEORGE N. WESTBY, *Primary Examiner.*

RALPH G. NILSON, *Examiner.*